United States Patent [19]

Huber

[11] Patent Number: 4,526,258
[45] Date of Patent: Jul. 2, 1985

[54] FLUID-OPERATED CLUTCH DISENGAGING APPARATUS

[75] Inventor: Lothar Huber, Bühl-Altschweier, Fed. Rep. of Germany

[73] Assignee: Luk Lamellen und Kupplungsbau GmbH, Bühl, Fed. Rep. of Germany

[21] Appl. No.: 414,432

[22] Filed: Sep., 1982

[30] Foreign Application Priority Data

Sep. 15, 1981 [DE] Fed. Rep. of Germany ....... 3136548

[51] Int. Cl.³ .................. F16D 23/14; F16D 25/08
[52] U.S. Cl. .................. 192/88 A; 92/98 D; 92/102; 192/91 A; 192/98
[58] Field of Search ............ 192/85 CA, 88 A, 91 A, 192/98; 92/98 D, 102, 165 PR; 277/103; 411/508

[56] References Cited

U.S. PATENT DOCUMENTS

| | | | |
|---|---|---|---|
| 2,692,618 | 10/1954 | Ludowice | 92/98 D |
| 2,717,680 | 9/1955 | Smith | 192/91 A |
| 2,725,078 | 11/1955 | Glancy | 92/98 D |
| 2,957,712 | 10/1960 | Farmer | 277/103 X |
| 2,983,529 | 5/1961 | Price | 277/53 X |
| 3,217,852 | 11/1965 | Brown et al. | 192/88 A |
| 3,311,205 | 3/1967 | Suppes et al. | 192/88 A |
| 3,756,115 | 9/1973 | Schuplin | 411/508 |
| 3,803,670 | 4/1974 | Johnson | 411/508 |
| 3,893,379 | 7/1975 | Cripe et al. | 277/103 X |
| 4,051,937 | 10/1977 | Garrett et al. | 192/91 A X |
| 4,143,748 | 3/1979 | Maucher | 192/98 |
| 4,144,957 | 3/1979 | de Gennes | 192/98 |
| 4,344,516 | 8/1982 | Kolb | 192/85 CA |
| 4,351,427 | 9/1982 | Miyahara | 192/98 |
| 4,384,387 | 5/1983 | Pachuta | 277/53 X |

FOREIGN PATENT DOCUMENTS

| | | | |
|---|---|---|---|
| 2217943 | 11/1972 | Fed. Rep. of Germany . | |
| 635315 | 3/1962 | Italy | 411/508 |
| 938327 | 10/1963 | United Kingdom | 411/508 |
| 1346974 | 2/1974 | United Kingdom | 192/91 A |

*Primary Examiner*—Rodney H. Bonck
*Attorney, Agent, or Firm*—Peter K. Kontler

[57] ABSTRACT

A clutch disengaging apparatus wherein an annular cylinder defines an annular cylinder chamber receiving a reciprocable annular piston with an annular outer clearance surrounding the outer skirt of the piston and an annular inner clearance surrounding the inner skirt of the piston. A membrane overlies the bottom wall of the piston and its marginal portions are clamped between the sections of the cylinder so that the membrane forms an outer corrugation in the outer clearance and an inner corrugation in the inner clearance. A throw-out bearing is radially movably mounted in the piston and is biased against the prongs of the diaphragm spring in a clutch by a coil spring which is surrounded by an inner wall of the cylinder, which surrounds an outer wall of the cylinder, or which is installed in the cylinder chamber between the bottom walls of the piston and the cylinder. The piston is guided against radial movement with reference to the cylinder by a tubular guide member which is connected to or forms an integral part of the inner wall of the cylinder and is tracked by one or more followers of the piston.

40 Claims, 7 Drawing Figures

FLUID-OPERATED CLUTCH DISENGAGING APPARATUS

BACKGROUND OF THE INVENTION

The present invention relates to fluid-operated disengaging apparatus for clutches, especially for clutches which are used in automotive vehicles. More particularly, the invention relates to improvements in clutch disengaging apparatus of the type disclosed, for example, in German Offenlegungsschrift No. 2,217,943.

The disengaging apparatus which is disclosed in the German publication employs a housing defining an annular cylinder chamber which is open at one end and receives an annular piston for a throw-out bearing. The apparatus further employs a membrane whose inner and outer marginal portions are secured to the housing, which has a median portion contacting the piston, and which further comprises an outer corrugation adapted to roll in an outer annular clearance between the cylinder and the external surface of the piston as well as an inner corrugation which can roll in an inner annular clearance between the internal surface of the piston and an adjacent housing wall when the piston moves axially of the cylinder chamber. The piston has freedom of radial movement with reference to the housing, i.e., the width of the inner and/or outer annular clearance can change in dependency on the extent of radial movement of the piston. The only means for guiding the piston are the aforediscussed corrugations of the membrane whose guiding or centering action is weak or negligible. If the piston is not in exact register with the rotary parts of the clutch, for example, with the customary diaphragm spring which is normally used in a friction clutch to establish or terminate the torque transmitting connection between the driving and driven components of the clutch, the corrugations of the membrane as well as other parts of the disengaging apparatus and/or clutch are subjected to pronounced stresses and wear which can result in shorter useful life of such parts and can entail considerable expenses for frequent inspection and maintenance.

OBJECTS AND SUMMARY OF THE INVENTION

An object of the invention is to provide a clutch disengaging apparatus whose useful life is longer than that of heretofore known apparatus, which can automatically compensate for eventual absence of accurate register between its parts and the elements of the clutch, and wherein the membrane need not guide the piston during axial movement of the latter with reference to the housing or cylinder of the apparatus.

Another object of the invention is to provide a disengaging apparatus which is constructed and assembled in such a way that the absence of accurate alignment between its piston and the rotary part or parts of the clutch does not adversely affect the useful life of the piston and/or clutch.

A further object of the invention is to provide a clutch disengaging apparatus which can be used as a superior substitute for heretofore known disengaging apparatus.

An additional object of the invention is to provide a highly compact clutch disengaging apparatus whose space requirements (as considered in the radial and/or axial direction of the piston) can be reduced well below the space requirements of heretofore known disengaging apparatus without unduly affecting the service life, operation and/or cost of the improved apparatus.

Another object of the invention is to provide the disengaging apparatus with novel and improved means for preventing penetration of dust and/or other impurities into contact with sensitive components, such as the membrane which seals the cylinder chamber from the surrounding atmosphere.

An additional object of the invention is to provide the disengaging apparatus with novel and improved means for normally maintaining the piston in an optimum position and with novel and improved means for confining the piston to axial movements in the cylinder chamber without endangering or adversely influencing the disengaging operation when the piston is not in accurate axial alignment with the rotary parts of the clutch.

The invention resides in the provision of a fluid-operated disengaging apparatus for clutches, especially for use in or with the clutches of automotive vehicles. The improved disengaging apparatus comprises a first unit including a cylinder having an open side and defining an annular cylinder chamber, and a second unit including an annular piston received in the chamber and defining with the cylinder an outer annular clearance which surrounds the piston and an inner annular clearance which is surrounded by the piston. The second unit further comprises a suitable release bearing or throw-out bearing which is arranged to share the movements of the piston relative to the cylinder (but preferably performs at least some movements with reference to the piston, preferably in the radial direction of the cylinder), and the disengaging apparatus further comprises an annular membrane having a median portion which contacts the piston in the chamber, inner and outer marginal portions secured to the first unit, and first and second (outer and inner) annular corrugations which are respectively located in the outer and inner clearances. Still further, the improved apparatus comprises guide means provided on at least one of the two units and serving to hold the piston against any, or against appreciable, radial movements relative to the cylinder in spite of the provision of the aforediscussed inner and outer annular clearances. The guide means can include a tubular guide member on the cylinder or another part of the first unit. For example, the guide means can comprise first and second portions which are respectively provided on the first and second units and cooperate with one another to prevent the penetration of solid impurities therebetween. Such portions of the guide means can constitute or form part of a dustproof seal between the cylinder and the piston in addition to that seal which is constituted by or includes the aforediscussed membrane.

The cylinder can be assembled of two or more sections including a first and a second section, and the second section can include a wall which is surrounded by the inner clearance and is rigid with the aforediscussed tubular guide member of the guide means for the piston. The first section can include a shell which is integral with the wall, and the latter can but need not be integral with the tubular guide member. Alternatively, or in addition to the just outlined first and second sections of the cylinder, the latter can comprise a first component (such as the aforementioned shell) and an additional component constituting or including a wall surrounding the outer clearance in such a way that the outer corrugation of the membrane rolls along the just mentioned wall while the piston moves axially in the cylinder chamber. The shell can extend substantially radially of the cylinder chamber and the wall which surrounds the outer clearance can extend substantially axially from the shell so that it surrounds the chamber and at least a portion of the piston.

The sections of the first unit can be designed to clamp the inner and/or outer marginal portion of the membrane therebetween. For example, the inner marginal portion of the membrane can be clamped between the shell and the wall which is surrounded by the inner clearance, and/or the outer marginal portion of the membrane can be clamped between the shell and the wall which surrounds the outer clearance. The sections which clamp the one or the other marginal portion of the membrane can have mutually inclined neighboring surfaces (e.g., conical surfaces of different tapers) which clamp the respective marginal portion of the membrane therebetween. The one or the other marginal portion of the membrane can include or constitute a bead which is sealingly held between the sections of the cylinder.

In accordance with a presently preferred embodiment of the invention, at least a portion of the first and/or second unit consists of a suitable synthetic plastic material. For example, the entire piston, the entire cylinder or at least the shell of the cylinder can consist of a synthetic plastic material.

At least one of the aforediscussed walls forming part of the first unit can be made of a suitable metallic material, such as steel, and the metallic wall or walls can be integral with or they may be sealingly or otherwise fixedly secured to the shell of the cylinder. For example, the cylinder can be provided with a collar overlapped by the wall which surrounds the outer clearance or by the wall which is surrounded by the inner clearance. The wall which overlaps or overlies the collar can have an upset or bent-over marginal zone which engages behind the collar to ensure reliable retention of such wall on the shell of the cylinder.

It is desirable to provide or establish at least one seal between at least one of the just discussed walls and the piston, especially between the piston and the outer wall, namely, the wall which surrounds the outer annular clearance. The seal can be a labyrinth seal or any other type of seal wherein a gap is provided between two relatively movable parts. Alternatively, the seal may constitute or include a mechanical seal, e.g., a felt ring which surrounds the piston and can be secured to the piston or to the inner side of the outer wall. Still further, the seal can include a second membrane which is disposed in the outer clearance and has a corrugation bulging in a predetermined direction, namely, counter to the direction in which the outer or first annular corrugation of the first mentioned membrane bulges in the outer annular clearance. If the seal comprises an annular sealing element (e.g., a ring made of rubber, an elastomeric synthetic plastic substance, felt or other suitable material), the outer wall can be provided with cooperating first and second retaining portions which clampingly engage the sealing element. One of these portions can constitute a first internal collar on the outer wall, and the other portion can include a sleeve surrounding the first collar and having a second internal collar adjacent to the first collar. The two collars flank the sealing element and are in sealing and clamping engagement therewith.

If the guide means comprises a tubular guide member which forms part of or is secured to the (inner) wall that is surrounded by the inner annular clearance, the piston can be provided with suitable follower means which is outwardly adjacent the tubular guide member and travels therealong when the piston is caused to move axially in response to admission of a pressurized fluid into or in response to evacuation of fluid from the cylinder chamber. The follower means can extend axially of the piston in a direction away from the cylinder chamber.

The disengaging apparatus can further comprise stop means which is preferably provided on the first unit and serves to limit the extent of axial movement of the piston in at least one direction. The stop means can be provided on the tubular guide member which, in turn, is provided on the aforediscussed inner wall of the first unit, namely, on the wall which is surrounded by the inner annular clearance between the piston and the first unit. The arrangement is preferably such that the piston is disposed between the cylinder chamber and the stop means.

The disengaging apparatus can comprise means (such as a helical or conical coil spring) for yieldably biasing the second unit in a direction to increase the volume of the cylinder chamber to thus ensure that the bearing contacts the prongs of the diaphragm spring in a conventional friction clutch or the like. The spring of the biasing means can be installed between a shoulder which is provided on the first unit (preferably in the region of the inner wall which is surrounded by the inner annular clearance) and one or more radially inwardly extending portions of the piston. Alternatively, the spring can surround the outer wall of the first unit to react against a shoulder which is provided in or on the first unit in the region of the outer wall. Such spring can bear against one or more radially outwardly extending portions of the piston. The spring can be installed in the cylinder chamber to act between the bottom wall of the piston and the bottom wall of the cylinder. The spring in the cylinder chamber preferably constitutes a conical coil spring and its front or foremost convolution can extend into an annular seat provided in a washer-like pressure distributing member which can be placed against the outer side of the bottom wall of the piston and which can serve to urge the median portion of the membrane against the bottom wall of the piston. The washer-like pressure distributing member is preferably formed with a suitably bent or deformed inner and/or outer marginal portion whose convex side or surface faces the adjacent part of median portion of the membrane so as to reduce the likelihood of damage to or extensive wear upon the membrane.

Still further, the distributing apparatus can include detent means preferably provided at the outer side of the bottom wall of the cylinder and serving to allow for rapid attachment of the apparatus to a component part of a clutch or to a component part of a transmission in an automotive vehicle. The detent means can comprise groups of prongs extending from the outer side of the bottom wall of the cylinder. At least one prong of each group is preferably movable relative to the other prong or prongs, and at least such movable prong is preferably elastic, at least in part, so that it can move relative to the other prong or prongs of the respective group in order to rapidly engage a component part by snap action or to be rapidly disengaged from such part.

The novel features which are considered as characteristic of the invention are set forth in particular in the appended claims. The improved disengaging apparatus itself, however, both as to its construction and the mode

DESCRIPTION OF THE PREFERRED EMBODIMENTS

Figure 1:
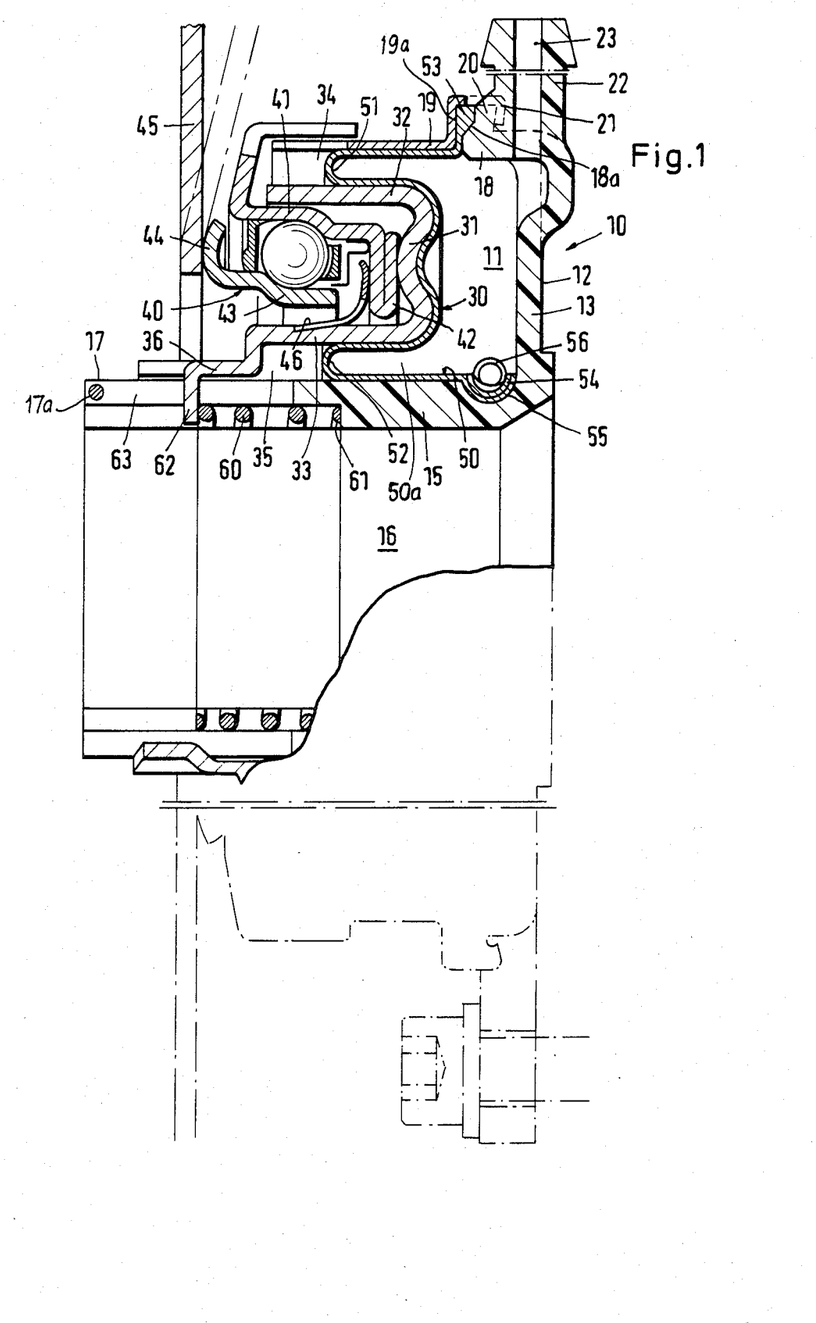
FIG. 1 is a fragmentary axial sectional view of a clutch disengaging apparatus which embodies one form of the present invention and wherein the biasing means comprises a cylindrical coil spring installed in the interior of the inner wall of the cylinder.

The clutch disengaging apparatus which is shown in FIG. 1 comprises a first unit or housing 10 including a cylinder 12 which defines an annular cylinder chamber 11 open at its left-hand axial end, as viewed in the drawing. The cylinder 12 comprises several sections including a shell 13 which is made of a suitable synthetic plastic material and constitutes or includes the bottom wall or the cylinder. Such bottom wall extends substantially radially of and behind the cylinder chamber 11. A second section of the cylinder 12 is integral with the shell 13 and constitutes a tubular inner wall 15 which is surrounded by the cylinder chamber 11. The latter is surrounded by a further section 19 which is a separately manufactured metallic part and constitutes a tubular outer wall or sleeve of the cylinder 12. The inner wall 15 surrounds a central passage 16 which can accommodate a rotary part, e.g., the input shaft of a change-speed transmission receiving torque from a friction clutch which is installed in an automotive vehicle and can receive torque from the flywheel on the crankshaft of an internal combustion engine.

In accordance with a feature of the invention, the illustrated disengaging apparatus further comprises novel and improved means for guiding an axially reciprocable annular piston 30 which is received in the cylinder 12 with adequate clearance and is reciprocable axially of the walls 15, 19 in directions to increase or reduce the volume of the cylinder chamber 11. The guide means comprises a tubular guide member 17 which is integral with the inner wall or section 15 and extends forwardly, i.e., in a direction away from the shell 13 of the cylinder 12.

The shell 13 of the cylinder 12 has a radially outermost portion 18 provided with a radially outwardly extending ring-shaped collar 20 which is surrounded by the rear marginal portion of the metallic wall or section 19. The rear marginal portion of the wall 19 is upset or bent over behind the collar 20, as at 21, to ensure reliable retention of the wall 19 on the shell 13. The latter is further formed with a nipple 22 having a radially extending channel 23 for admission or evacuation of a preferably hydraulic fluid which is used to move the piston 30 forwardly, i.e., to the left, as viewed in FIG. 1.

The piston 30 is an annular element, which can be produced by drawing or by resort to any other mass-producing technique, and comprises a bottom wall 31 facing the bottom wall of the cylinder 12, a tubular outer part or skirt 32 which is spaced apart from the wall 19 of the cylinder 12, and a tubular inner part or skirt 33 which is spaced apart from the inner wall 15 of the cylinder 12. The dimensions of the skirts 32 and 33 are selected in such a way that the piston 30 and the cylinder 12 define an annular outer clearance 34 between the skirt 32 and the wall 19 and an annular inner clearance 35 between the wall 15 and skirt 33. The width of the clearance 34, as considered in the radial direction of the cylinder 12, preferably equals or approximates the width of the clearance 35. The inner skirt 33 of the piston 30 comprises a radially inwardly and axially extending follower portion 36 which is a tube surrounding the guide member 17 and forming part of the guide means for the piston 30. The portions 17 and 36 of the composite guide means cooperate to ensure that the width of the annular clearances 34 and 35 remains at least substantially unchanged in each axial position of the piston 30 with reference to the cylinder 12.

The bottom wall 31 and the skirts 32, 33 of the piston 30 define an annular compartment whose front side is open and which receives a throw-out bearing 40 constituting, together with the piston 30, the second or mobile unit or component of the improved disengaging apparatus. The bearing 40 shares all movements but is movable substantially radially relative to the piston 30 to thus compensate for eventual absence of accurate axial alignment between the piston 30 and that part or those parts of the clutch which are engaged, or are to be engaged, by the bearing 40 when the clutch is to be disengaged. The outer race 41 of the bearing 40 has a radially extending rear portion 42 which is biased against the front side of the bottom wall 31 of the piston 30 by a ring-shaped diaphragm spring 46 having prongs snapped into a circumferential recess of the inner skirt 33. The spring 46 holds the portion 42 against axial movement relative to the piston 30 but allows the outer race 41 (and hence the entire throw-out bearing 40) to move radially of the piston when the friction between the parts 31 and 42 is overcome. The inner race 43 of the bearing 40 has a ring-shaped forwardly projecting extension 44 contacting the radially inwardly extending prongs of a customary diaphragm spring 45 forming part of a friction clutch. The clutch is disengaged when the prongs of the diaphragm spring 45 are caused to move in a direction to the left, as viewed in FIG. 1, to thereby cause the spring 45 to change its conicity and to disengage the clutch disc from the pressure plate or plates of the clutch in a manner not forming part of the present invention. Reference may be had, for example, to commonly owned U.S. Pat. No. 3,811,544, granted May 21, 1974 to Paul Maucher, which discloses a friction clutch capable of being disengaged by the apparatus of the present invention. If the diaphragm spring 45 is not exactly coaxial with the bearing 40, the outer race 41 moves radially of the piston 30 against the opposition of the spring 46, and such radial movement of the outer race 41 is terminated when the axis of the bearing 40 coincides with the axis of the diaphragm spring 45.

The disengaging apparatus further comprises an annular membrane 50 which seals the open end of the cylinder chamber 11 and includes a central portion 50a overlying the rear side of the bottom wall 31 of the piston 30. The membrane 50 further comprises an outer ring-shaped corrugation 51 which bulges forwardly and is located in the clearance 34, an inner ring-shaped corrugation 52 which also bulges forwardly and is received in the inner clearance 35, an outer marginal portion 53 which constitutes a bead and is clamped between the mutually inclined surfaces 19a and 18a of the wall 19 and shell 13, and an inner marginal portion 54 extending into a circumferential recess or groove 55 of the wall 15 and held therein by a split ring 56 or in any other suitable way. The stressing of the split ring 56 (as considered in the radial direction of the cylinder 12) is sufficient to ensure that the preferably beaded marginal portion 54 is properly retained in the groove 55, i.e., that the membrane 50 can withstand the pressures which prevail in the cylinder chamber 11 when the latter receives pressurized fluid via channel 23 in order to induce the extension 44 of the inner race 43 to change the conicity of the diaphragm spring 45 and hence the condition of the clutch.

The disengaging apparatus also comprises means for yieldably biasing the unit including the piston 30 and the bearing 40 in a given direction, namely, in a direction to increase the volume of the cylinder chamber 11. The biasing means comprises a prestressed cylindrical coil spring 60 which bears against the piston 30 and reacts against the unit 10. More specifically, the rearmost convolution of the spring 60 reacts against an internal shoulder 61 of the wall 15, and the foremost convolution of the spring 60 bears against one or more pronglike radially inwardly extending portions 62 of the follower 36. The portions 62 extend through axially parallel slots 63 in the tubular guide member 17. The spring 60 ensures that the extension 44 of the inner race 43 abuts against the prongs of the diaphragm spring 45 in each axial position of the piston 30.

When the channel 23 of the nipple 22 admits a pressurized hydraulic fluid into the cylinder chamber 11, the pressurized fluid acts on the membrane 50 which, in turn, causes the unit including the piston 30 and the bearing 40 to move in a direction to the left, as viewed in FIG. 1, i.e., away from the bottom wall of the cylinder 12. The extension 44 of the inner race 43 depresses the prongs of the diaphragm spring 45 so that the latter disengages the clutch in the aforedescribed manner. The diaphragm spring 45 opposes the leftward movement of the piston 30, but such movement is assisted by the coil spring 60. When the pressure in the cylinder chamber 11 is relaxed, e.g., when the nipple 22 is connected with the sump, the prongs of the diaphragm spring 45 are free to depress the extension 44, and with it the entire bearing 40 and piston 30, deeper into the cylinder chamber 11 so that the clutch is reengaged and the fluid is expelled from the chamber 11 via channel 23.

The corrugations or loops 51 and 52 of the membrane 50 roll in the respective annular clearances 34 and 35 in response to axial movement of the piston 30 between the walls 15 and 19 of the unit 10. The radial position of the piston 30 remains at least substantially unchanged because its follower 36 slides along the external surface of the tubular guide member 17.

The maximum extent of forward movement of the piston 30 can be determined by one or more stops 17a in the slots 63 of the guide member 17. The bottom wall of the shell 13 can be said to constitute a stop which limits the extent of rearward movement of the piston 30 with reference to the cylinder 12.

An important advantage of the improved disengaging apparatus is that the membrane 50 is not subjected to excessive stresses, even in the case of misalignment between the clutch and the transmission or between the piston 30 and the clutch. It will be readily appreciated that the extent of misalignment between a clutch and a transmission cannot exceed a certain value; however, within the permissible range of misalignment, the improved apparatus can readily ensure that the bearing 40 can be centered by the diaphragm spring 45 by moving radially of the piston 30 while the latter is held (by the guide means 17, 36) against any, or against appreciable, radial movement relative to the cylinder 12. The simple expedient of more or less permanently centering the piston 30 relative to the cylinder 12 ensures that the wear upon the membrane 50 is reduced to a small fraction of wear in conventional disengaging apparatus wherein the entire piston must participate in radial displacement of the bearing when the latter is not in accurate axial alignment with the adjacent part or parts of the clutch. The feature that the guide means performs at least some sealing or impurities-intercepting function also contributes to a reduction of wear upon, and hence to longer service life of, the membrane 50 and other sensitive parts which are shielded from dust or the like by the follower 36 in cooperation with the tubular guide member 17.

The making of some or all of the parts of the cylinder and/or piston from a suitable synthetic plastic material contributes to lower cost of the disengaging apparatus because synthetic plastic parts can be mass-produced in accordance with any of a number of well known techniques. However, the utilization of metallic parts (such as the wall 19) may be advisable under certain circumstances, for example, to reduce the complexity of the form for the making of plastic parts and/or to employ a material which is particularly suited to stand certain types of stresses and/or other (such as corrosive) influences. Moreover, a metallic sleeve-like part can be readily secured to a plastic part (such as by the formation of a collar and by upsetting as shown in the upper part of FIG. 1).

Figure 2:
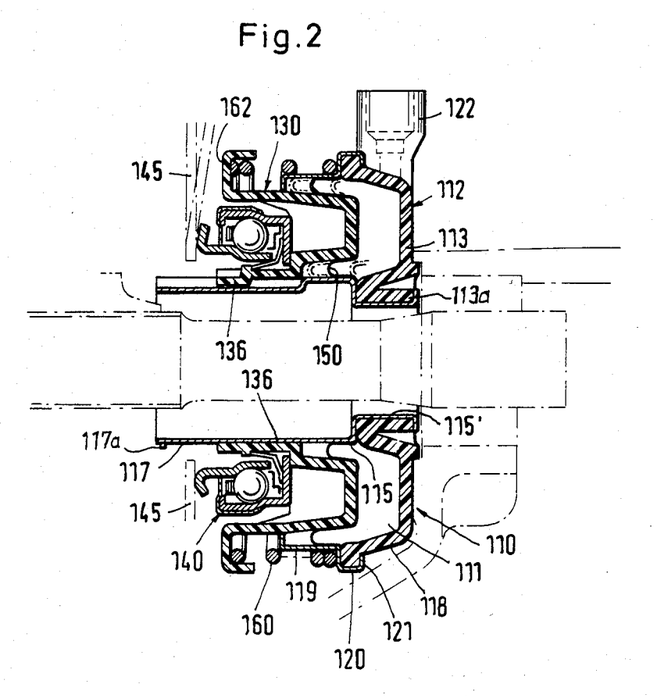
FIG. 2 is an axial sectional view of a second disengaging apparatus wherein the biasing means comprises a cylindrical coil spring surrounding the outer wall of the cylinder.

FIG. 2 shows a second disengaging apparatus wherein all such parts which are identical with or clearly analogous to corresponding parts of the disengaging apparatus of FIG. 1 are denoted by similar reference characters plus 100. One of the more important differences between the embodiments of FIGS. 1 and 2 is that the entire annular piston 130 consists of a suitable synthetic plastic material. Furthermore, the first unit 110 comprises a cylinder 112 having a shell 113 made of a synthetic plastic material, an inner tubular wall or section 115 made of a metallic material, and a metallic outer tubular wall or section 119. The tubular guide member 117 of the guide means for the piston 130 is an integral (front) part of the metallic inner wall 115. The inner wall 115 has a rear marginal portion 115' which overlies and is bent or upset behind a cylindrical portion or collar 113a of the shell 113. The collar 113a can be said to constitute a shortened equivalent of the wall 15 and the part 115, 115' can be said to constitute a rearward extension of the guide member 117. The radially outermost portion 118 of the shell 113 has a ring-shaped collar 120 which is overlapped by the rear marginal portion of the outer wall 119. The rear marginal portion of the wall 119 has a bent-over or upset portion 121 engaging behind the collar 120 to ensure adequate retention of the wall 119 on the shell 113 of the cylinder 112. The marginal portions of the annular membrane 150 are clamped and safely held by the rear marginal portion of the outer wall 119 and by the marginal portion 115' of the inner wall 115. The inner and outer corrugations of the membrane 150 can roll in the corresponding annular clearances between the piston 130 and the inner and outer walls 115, 119, respectively, when the piston 130 is caused to move axially of the annular cylinder chamber 111.

A further difference between the embodiments of FIGS. 1 and 2 is that the biasing means for the piston 130 comprises a cylindrical coil spring 160 which concentrically surrounds the outer wall 119 of the cylinder 112, which reacts against a shoulder of the cylinder 112 (and more specifically against an external shoulder of the rear marginal portion of the wall 119), and which bears against a radially outwardly extending annular (circumferentially complete or interrupted) portion or retainer 162 of the piston 130.

FIG. 2 further shows a stop 117a which is a protuberance bent outwardly from the general plane of the tubular guide member 117 and serving to limit the extent of forward movement of the follower portion 136 of the piston 130. The protuberance 117a is bent radially outwardly after the piston 130 is slipped onto the tubular guide member 117. The just described mode of providing stop means against excessive forward movement of the piston 130 (i.e., against dissipation of excessive quantities of energy by the coil spring 160) is extremely simple and reliable. This is desirable not only when the disengaging apparatus is in use but also during storage and transport to the locus of utilization.

Figure 3:
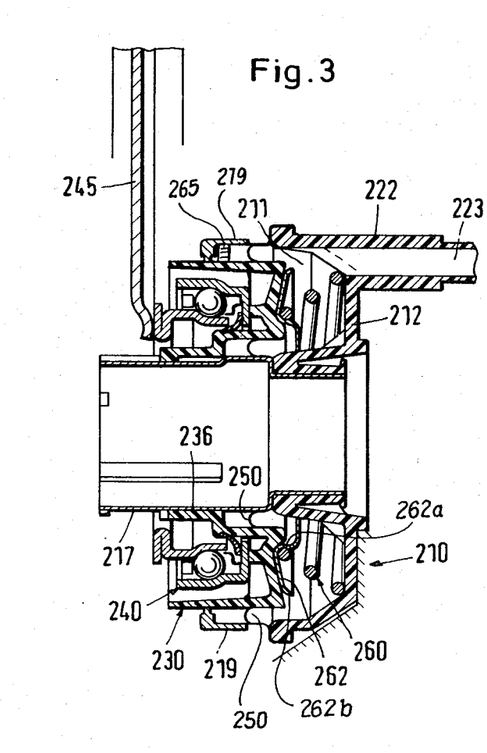
FIG. 3 is an axial sectional view of a third disengaging apparatus wherein the biasing means comprises a conical coil spring in the cylinder chamber.

FIG. 3 shows a third embodiment of the disengaging apparatus wherein all such parts which are identical with or clearly analogous to corresponding parts of the apparatus of FIG. 1 are denoted by similar reference characters plus 200. The biasing means for the annular piston 230 comprises a conical coil spring 260 which is installed in the annular cylinder chamber 211 so that it reacts against the bottom wall of the cylinder 212 and bears against the bottom wall of the piston 230. The foremost convolution of the coil spring 260 extends into a ring-shaped socket 262a provided in the rear side of a washer-like pressure distributing member 262 which is adjacent to the rear side of the piston 230. The pressure distributing member 262 performs the additional function of urging the median portion of the annular membrane 250 against the rear side of the bottom wall of the piston 230. The marginal portions of the membrane 250 are clamped between the adjacent sections of the cylinder 212 in the same way as described in connection with FIG. 1 or FIG. 2 or in another suitable way. The tubular guide member of the guide means for the piston 230 is shown at 217; this guide member cooperates with the surrounding follower portion 236 of the piston. The outer marginal portion 262b of the pressure distributing member 262 is curved or rounded so as to be provided with a convex surface which faces the adjacent portion of the membrane 250. This greatly reduces the likelihood of premature wear upon, or even more serious damage to, the membrane (by the spring 260 and/or by the member 262) when the improved disengaging apparatus is in use.

An important advantage of the conical spring 260 is that its convolutions can be moved into or close to a common plane extending at right angles to the axis of the unit 210 when the piston 230 is caused to move deeper into the cylinder chamber 211. Therefore, the dimensions of the apparatus shown in FIG. 3 can be reduced to a small fraction of the dimensions of a conventional disengaging apparatus. Such pronounced penetration of the piston 230 into the chamber 211 is necessary when the clutch including the diaphragm spring 245 undergoes pronounced wear. Furthermore, by appropriate selection of the surfaces which contact the two end convolutions of the spring 260, one can ensure that the spring is subjected to a self-centering action.

The nipple 222 and its channel 223 extend in at least substantial parallelism with the axis of the apparatus shown in FIG. 3. The release or throw-out bearing 240 is somewhat different from the bearing 40 of FIG. 1; however, its function is analogous, i.e., it is capable of performing at least some radial movements with reference to the piston 230 so that it is automatically centered in response to contact of its inner race with the prongs of the diaphragm spring 245.

FIG. 3 further shows a mechanical seal, e.g., a felt ring 265, which is interposed between the outer wall 219 of the cylinder 212 and the adjacent outer skirt of the piston 230. This mechanical seal prevents penetration of dust or other foreign matter into the outer annular clearance so that contaminants cannot interfere with rolling of the outer corrugation of the membrane 250 and/or otherwise shorten the useful life of such outer corrugation.

Figure 4:
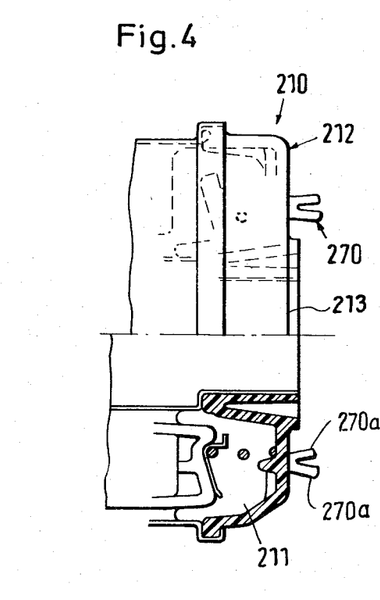
FIG. 4 is a partly elevational and partly sectional view of an apparatus which constitutes a slight modification of the disengaging apparatus of FIG. 3 and comprises detent means for facilitating rapid and predictable attachment of the apparatus to the housing of a clutch or transmission.

FIG. 4 shows a slightly modified version of the disengaging apparatus which is shown in FIG. 3. The bottom wall of the shell 213 forming part of the cylinder 212 of the unit 210 is formed with a detent structure including several groups 270 of prongs 270a which can engage complementary parts of the housing of a clutch or the housing of a change-speed transmission to safely retain the disengaging apparatus in a selected position. At least one prong 270a of each group 270 is preferably elastic so that it can cooperate with the other prong or prongs of the same group in order to retain a complementary part on a clutch or the like. The prongs 270a extend substantially axially of the disengaging apparatus and at least the elastic prong or prongs are movable radially toward or away from the other prong or prongs of the same group. For example, each of the prongs 270a can snap into a complementary recess or socket in a housing or the like. Such mounting of the disengaging apparatus on a clutch or transmission housing ensures accurate positioning of the throw-out bearing with reference to the diaphragm spring of the clutch.

Figure 5:
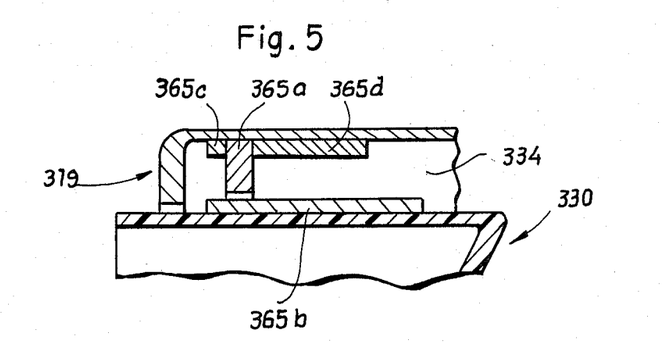
FIG. 5 is a fragmentary axial sectional view of a further apparatus wherein the seal in the outer annular clearance between the cylinder and the piston is a labyrinth seal.

FIG. 5 illustrates a labyrinth seal (e.g., a seal resembling a hydrostatic seal) between the outer skirt of the piston 330 and the wall 319 of the first unit. The seal is installed in the outer annular clearance 334 and includes an inner annular member 365b secured to the skirt of the piston 330 and an outer annular member 365a secured to the internal surface of the wall 319 and defining with the member 365b a gap as is customary in such types of seals. The outer annular member 365a is clamped between two ring-shaped holders 365c, 365d at the inner side of the wall 319.

Figure 6:
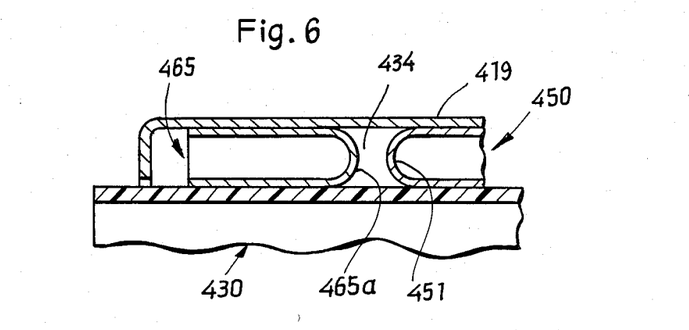
FIG. 6 is a fragmentary axial sectional view of an additional apparatus wherein the seal constitutes a membrane.

FIG. 6 shows another seal which includes a second membrane 465 received in the outer annular clearance 434 between the wall 419 of the first unit and the outer skirt of the piston 430. The corrugation 465a of the membrane 465 bulges counter to the direction of bulging of the corrugation 451 of the membrane 450. In other words, the convex sides of the corrugations 465a and 451 face each other in the clearance 434. The manner in which the marginal portions of the membrane 465 are sealingly secured to the inner side of the wall 419 and to the outer side of the outer skirt of the piston 430 is not specifically shown in FIG. 6.

Figure 7:
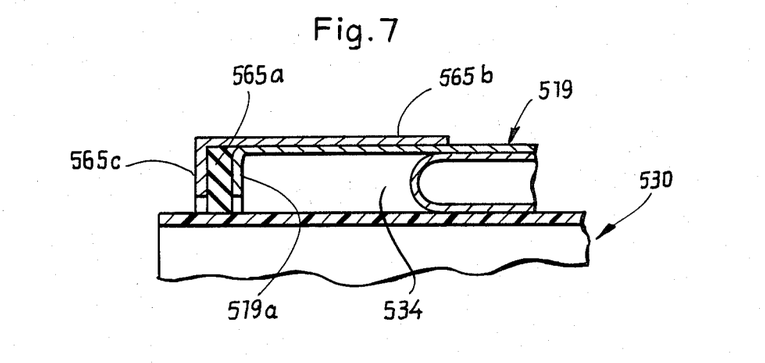
FIG. 7 is a fragmentary axial sectional view of still another disengaging apparatus wherein a mechanical seal is clamped between two collars of the first unit.

FIG. 7 shows a further seal including a ring-shaped sealing element 565a between an inwardly extending collar 565c of a sleeve 565b which surrounds the wall 519, and a second inwardly extending collar 519a preferably forming an integral part of the foremost portion of the wall 519. The element 565a sealingly contacts the outer skirt of the piston 530 in the annular outer clearance 534. The collars 519a and 565c clampingly and sealingly engage the adjacent sides of the sealing element 565a.

The provision of adequate seals which shield the membrane 50, 150, 250, etc. from undesirable influences has been found to be very important and advantageous because a relatively simple seal can greatly prolong the useful life of the membrane. The sealing means 265, 365a-365b, 465 or 565a (or analogous sealing means) can also be provided in the inner annular clearance, such as the clearance 35 shown in FIG. 1. However, and since the illustrated guide means are provided in front of such inner clearance, and since the guide means can readily perform a highly satisfactory dustproofing or analogous sealing action, the provision of sealing means in the outer annular clearance is particularly advantageous because such sealing means performs in the outer clearance the function of the guide means in the inner clearance, i.e., the guide means shields the inner corrugation and the illustrated sealing means 265, 365a-365b, 465 or 565a shields the outer corrugation of the membrane.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A fluid-operated disengaging apparatus for clutches, especially for the clutches of automotive vehicles, comprising a first unit including a stationary cylinder having an open side, including an outer tubular wall and defining an annular cylinder chamber; a second unit including a hollow annular piston axially reciprocably received in said chamber and defining with said cylinder an outer annular clearance surrounded by said outer tubular wall and an inner annular clearance, said second unit further including a throw-out bearing disposed in the interior of and arranged to share the axial movements of said piston relative to said cylinder and being movable substantially radially of and within limits relative to said cylinder and said piston; an annular membrane having a median portion contacting the piston in said chamber, inner and outer marginal portions secured to said first unit, and first and second annular corrugations respectively located in said outer and inner clearances; guide means provided on at least one of said units to hold said piston against radial movement relative to said cylinder, said guide means comprising an inner tubular wall forming part of said first unit and disposed radially inwardly of said chamber and follower means provided on said piston and movable only axially of said inner tubular wall; and a seal provided in said outer clearance between the open side of said cylinder and said first corrugation.

2. The disengaging apparatus of claim 1, wherein said inner tubular wall and said follower means constitute a second seal which prevents the penetration of impurities therebetween.

3. The disengaging apparatus of claim 2, wherein said inner tubular wall and said follower means constitute a dustproof seal between said cylinder and said piston.

4. The disengaging apparatus of claim 1, wherein said cylinder includes a first section and a second section, said second section including a wall surrounded by said inner clearance and said inner tubular wall is rigid with said wall.

5. The disengaging apparatus of claim 4, wherein said first section includes a shell which is integral with said inner tubular wall.

6. The disengaging apparatus of claim 1, wherein said cylinder includes a first section and a second section, said second section including said outer tubular wall and the first corrugation of said membrane being arranged to roll along said outer tubular wall in response to axial movement of the piston in said chamber.

7. The disengaging apparatus of claim 6, wherein said first section includes a shell which extends substantially radially of said chamber and said outer tubular wall extends substantially axially from said shell so that it surrounds said chamber.

8. The disengaging apparatus of claim 1, wherein said cylinder includes first and second sections and one marginal portion of said membrane is clamped between said sections.

9. The disengaging apparatus of claim 8, wherein said second section includes said inner tubular wall.

10. The disengaging apparatus of claim 8, wherein said sections have mutually inclined neighboring surfaces and said one marginal portion is clamped between such neighboring surfaces.

11. The disengaging apparatus of claim 8, wherein said one marginal portion includes a bead which is sealingly held between said sections.

12. The disengaging apparatus of claim 1, wherein at least a portion of at least one of said units consists of synthetic plastic material.

13. The disengaging apparatus of claim 1, wherein at least one of said walls consists at least in part of a metallic material.

14. The disengaging apparatus of claim 13, wherein said cylinder includes a substantially annular collar overlapped by said one wall.

15. The disengaging apparatus of claim 14, wherein said one wall has an upset marginal zone engaging said collar.

16. The disengaging apparatus of claim 1, wherein said seal is a labyrinth seal.

17. The disengaging apparatus of claim 1, wherein said seal is a mechanical seal.

18. The disengaging apparatus of claim 17, wherein said mechanical seal includes a felt ring surrounding said piston.

19. The disengaging apparatus of claim 1, wherein said seal includes a second membrane disposed in said outer clearance and having a corrugation bulging in a first direction, said first annular corrugation bulging in the opposite direction.

20. The disengaging apparatus of claim 1, wherein said seal includes an annular sealing element in said outer clearance, said outer tubular wall having cooperating first and second portions clampingly engaging said sealing element.

21. The disengaging apparatus of claim 20, wherein one of said wall portions includes a first internal collar provided on said outer tubular wall and the other of said wall portions includes a sleeve surrounding said first collar and having a second internal collar adjacent said first collar, said seal being disposed between said collars.

22. The disengaging apparatus of claim 1, wherein said follower means extends axially of said piston in a direction away from said cylinder chamber.

23. The disengaging apparatus of claim 1, wherein said first unit includes stop means for limiting the extent of axial movement of said piston in one direction.

24. The disengaging apparatus of claim 23, wherein said stop means is provided on said inner tubular wall.

25. The disengaging apparatus of claim 24, wherein said piston is disposed between said chamber and said stop means.

26. The disengaging apparatus of claim 1, further comprising means for yieldably biasing said second unit in a direction to increase the volume of said cylinder chamber.

27. The disengaging apparatus of claim 26, wherein said biasing means comprises at least one spring.

28. The disengaging apparatus of claim 27, wherein said first unit further comprises a shoulder in the region of said inner tubular wall, said piston having a substantially radially extending portion and said spring reacting against said shoulder and bearing against said radially extending portion of said piston.

29. The disengaging apparatus of claim 27, wherein said first unit further comprises a shoulder in the region of said outer tubular wall, said piston having a substantially radially outwardly extending portion and said spring reacting against said shoulder and bearing against said radially extending portion of said piston.

30. The disengaging apparatus of claim 27, wherein said spring is located in said cylinder chamber.

31. The disengaging apparatus of claim 30, wherein said piston has a first bottom wall facing said cylinder chamber and said cylinder includes a second bottom wall facing said first bottom wall, said spring being disposed between said bottom walls.

32. The disengaging apparatus of claim 31, further comprising pressure distributing means interposed between said spring and the bottom wall of said piston.

33. The disengaging apparatus of claim 32, wherein said median portion of said membrane is disposed between the bottom wall of said piston and said pressure distributing means.

34. The disengaging apparatus of claim 33, wherein said pressure distributing means comprises a washer-like member having inner and outer marginal portions at least one of which has a convex surface facing said median portion of said membrane.

35. The disengaging apparatus of claim 32, wherein said pressure distributing means includes an annular seat facing the bottom wall of said cylinder and said spring includes an end portion received in said seat.

36. The disengaging apparatus of claim 30, wherein said spring is a conical spring.

37. The disengaging apparatus of claim 1, wherein said cylinder includes a bottom wall having an outer side facing away from said chamber, and further comprising detent means provided at said outer side of said bottom wall to facilitate attachment of the apparatus to a component part of a clutch or transmission.

38. The disengaging apparatus of claim 37, wherein said detent means comprises prongs extending from the outer side of said bottom wall.

39. The disengaging apparatus of claim 38, wherein said prongs are disposed in groups of at least two prongs each whose prongs are movable toward and away from each other.

40. The disengaging apparatus of claim 39, wherein at least one prong of each group is at least slightly elastic.

* * * * *